United States Patent [19]

Madey

[11] Patent Number: 4,461,004
[45] Date of Patent: Jul. 17, 1984

[54] EXCITATION CANCELLING FREE ELECTRON LASER

[76] Inventor: John M. J. Madey, 2120 Amherst St., Palo Alto, Calif. 94087

[21] Appl. No.: 515,081

[22] Filed: Jul. 18, 1983

Related U.S. Application Data

[63] Continuation-in-part of Ser. No. 279,122, Jun. 30, 1981.

[51] Int. Cl.³ ................................................ H01S 3/00
[52] U.S. Cl. ...................................................... 372/2
[58] Field of Search ............................................. 372/2

Primary Examiner—William L. Sikes
Assistant Examiner—Léon Scott
Attorney, Agent, or Firm—Townsend and Townsend

[57] ABSTRACT

A gain-expanded free electron laser in which a relativistic electron beam exchanges energy with an electromagnetic wave in an interaction region defined by a magnet system is configured to suppress betatron excitation. The magnet system, the electromagnetic wave, and electron beam are characterized by a net optical phase slip qL during the interaction between the phase of the electromagnetic wave and the phase of the electron transverse velocity, and a net betatron phase advance $\widetilde{\Lambda}L$. The optical phase slip and the betatron phase advance are chosen to satisfy the following constraints $$|qL| = K\pi$$

$$|qL - \widetilde{\Lambda}L| = M2\pi$$

where K is an integer and M is a positive integer. These constraints suppress the excitation of the betatron motion that is excited during the pass of the electrons through the interaction region. The constraints are typically realized by first choosing the operating wavelength or electron energy to satisfy the constraint on q, and then choosing the dispersion constant or the magnetic field to generate a value of $\widetilde{\Lambda}$ differing from qL by a multiple of $2\pi$.

5 Claims, 6 Drawing Figures

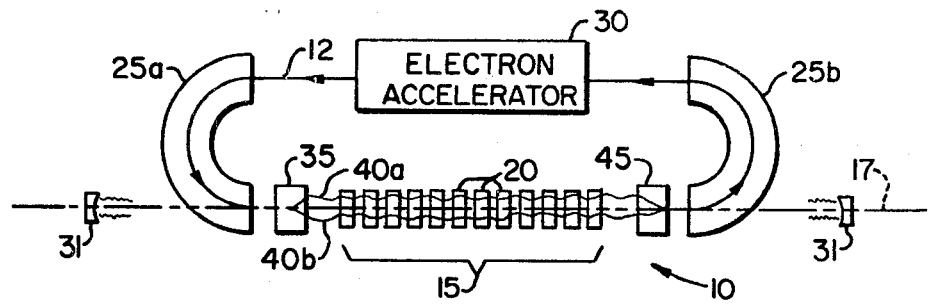
FIG._1A. (PRIOR ART)
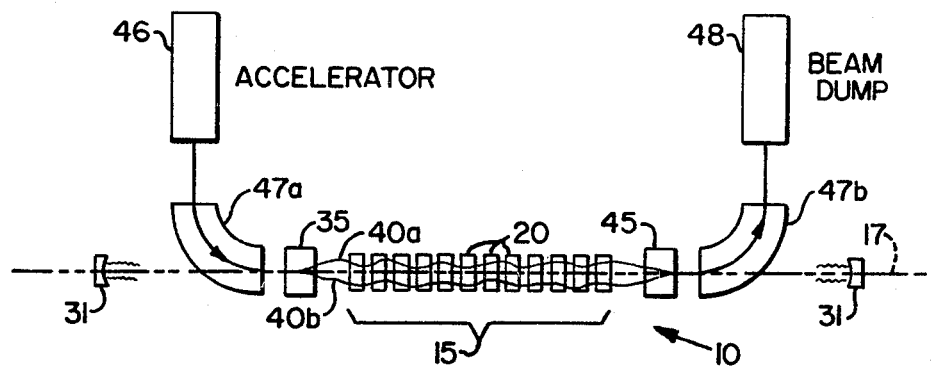
FIG._1B. (PRIOR ART)
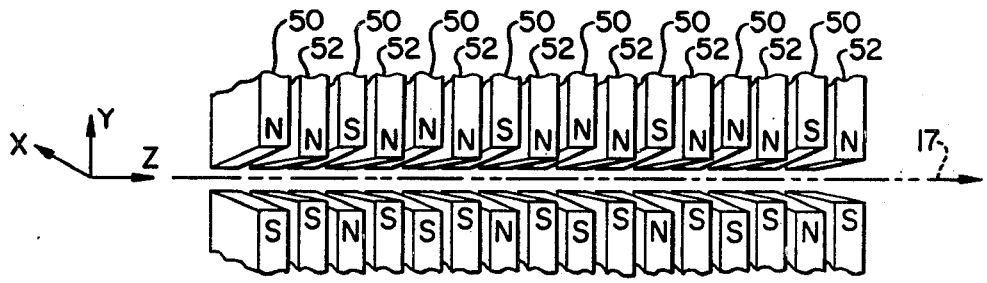
FIG._2.
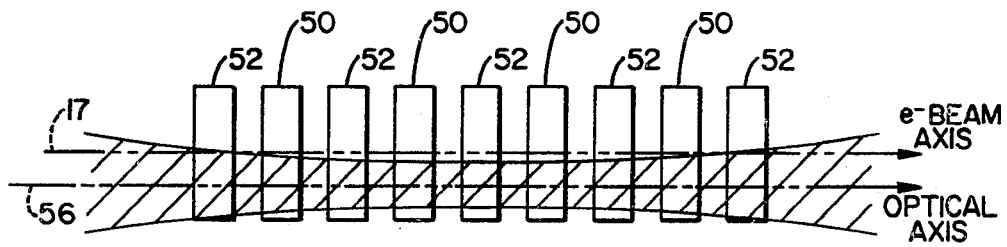
FIG._3.

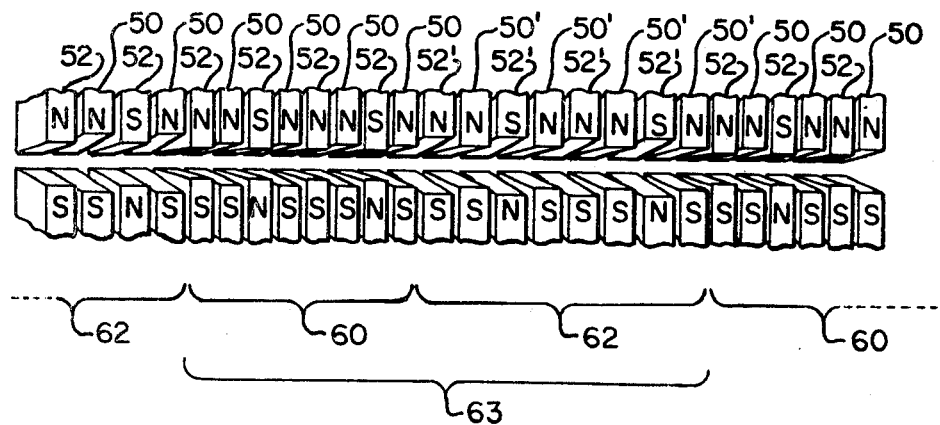
FIG._4.
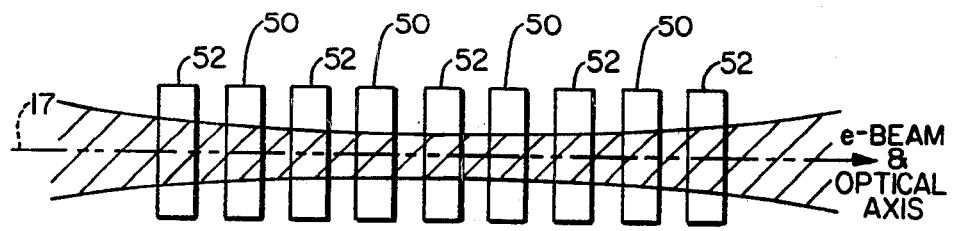
FIG._5.
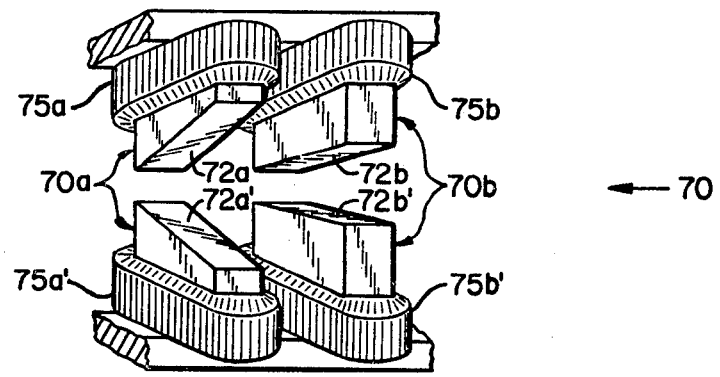
FIG._6.

EXCITATION CANCELLING FREE ELECTRON LASER

The Government has rights in this invention pursuant to Contract No. DASG60-77-C-0083 awarded by Ballistic Missile Defense System Command, Department of the Army.

This application is a continuation-in-part of copending application Ser. No. 279,122, filed June 30, 1981.

FIELD OF THE INVENTION

The present invention relates to free electron lasers.

BACKGROUND OF THE INVENTION

Two desirable attributes of lasers operable in the visible and infrared are high output power and tunable output wavelength. These attributes are available individually—existing carbon dioxide lasers are capable of providing 10 kilowatts or more output at a fixed wavelength, and there exist tunable lasers capable of providing variable visible wavelengths at output powers ranging from milliwatts up to approximately 10 watts. However, there have not heretofore been any lasers capable of providing both of the sought after attributes in a single device.

The free electron laser ("FEL") as described in U.S. Pat. No. 3,822,410 issued July 2, 1974 to John M. J. Madey has shown considerable promise in making available a tunable high power device. In a free electron laser, a relativistic electron beam is caused to interact with an electromagnetic wave in the presence of a transverse, periodic magnetic field (provided by a so-called "wiggler magnet" system). Assuming a TEM electromagnetic wave, the operating wavelength $\lambda$ is given by:

$$\lambda = (1 - v_{par}/c)\lambda_q \quad (1\text{-}1)$$

where
$v_{par}$=electron longitudinal velocity, measured parallel to the direction of propagation of the electromagnetic wave
c=speed of light
$\lambda_q$=magnet period, measured parallel to the direction of propagation of the electromagnetic wave, This relationship follows from the requirement that the frequency of the electrons' spontaneous radiation match the frequency of the electromagnetic radiation to be amplified, or alternatively, that the electrons' transverse velocity remain synchronized with the optical electric field during the interaction. In systems involving wave propagation at velocities less than c, as in a wave guide or light pipe, c would be replaced by the phase velocity of the wave.

The electrons' longitudinal velocity is determined by their energy, the direction of their motion through the wiggler magnetic field, and the period and amplitude of the magnetic field. Thus, in a conventional free electron laser, the wavelength $\lambda$ is approximately given by:

$$\lambda = \frac{\lambda_q}{2\gamma_0^2}(1 + \alpha^2 B^2 + \gamma_0^2 \theta^2) \quad (1\text{-}2)$$

where
$\gamma_0 mc^2$=electron energy at which laser is designed to operate (ergs)

$$\alpha^2 B^2 \equiv \left(\frac{e}{mc^2}\right)^2 \left(\frac{\lambda_q B_0}{2\pi}\right)^2$$

m=electron rest mass (grams)
e=electron charge (statcoulombs)
$B_0$=rms amplitude of the periodic magnetic field (gauss)
$\theta$=average angle at which electrons move through the interaction region, measured relative to the direction of propagation of the electromagnetic field.

While the dependence of wavelength on electron energy permits the free electron laser to be tuned by varying the electron beam energy, the dependence of wavelength on energy also introduces problems, especially where the electron energy is poorly defined. More particularly, if the electron energy spread is large, the phase match condition of Equation (1-1) will be violated for some portion of the electron distribution, and the laser gain and power output will be reduced.

One approach to solving this problem is the subject of copending U.S. patent application Ser. No. 55,163 of Smith et al., filed July 6, 1979, and entitled "Free Electron Laser." The techique disclosed therein is known as gain expansion and seeks to preserve the phase match condition for electrons of differing energies by causing the higher energy electrons to move through the periodic magnet in a region of higher magnetic field or at a larger angle $\theta$. From Equations (1-1) and (1-2) it can be seen that the phase match condition ($v_{par}$ independent of energy) will be preserved so long as the electrons are dispersed in transverse position or angle such that the ratio $(1+\alpha^2 B^2 + \gamma^2\theta^2)^{\frac{1}{2}}/\gamma$ remains constant.

The deviation of the electrons' actual transverse coordinates from their nominal coordinates defines the "betatron amplitude" $x_\beta$ as follows:

$$X_\beta(z) = x(z) - \tilde{x}(z) \quad (1\text{-}3)$$

where
z=longitudinal coordinate
$\tilde{x}(z)$=nominal transverse position of electron with energy $\gamma mc^2$
$x(z)$=actual transverse position of electron.

In the discussion that follows, it is assumed that the wiggler magnet field has been designed so that $v_{par}$ is a constant for all nominal trajectories. The magnitude of $x_\beta$ and its derivative $x_\beta'$ with respect to z is a measure of the loss of correlation of the energy and transverse coordinates. The betatron amplitude will evolve, along with the energy, as the electron beam moves through the laser magnet. This betatron motion is troublesome for both single pass and storage ring FEL systems. In single pass systems, the excitation of the betatron coordinates increases both the radius of the electron beam and the angular divergence. This increases the complexity and cost of the system required to transport the electron beam to the beam dump or through the decelerating means used to recover the kinetic energy left over at the end of the interaction region.

While the betatron motion in a storage ring is usually damped by the synchrotron radiation, the damping rate is typically small. If, in a gain-expanded storage ring free electron laser, the growth of $x_\beta$ and $x_\beta'$ in a single passage through the laser exceeds the reduction of these quantities due to synchrotron damping, the betatron amplitude will grow from pass to pass through the laser, and the correlation of energy and transverse position required to maintain constant $v_{par}$ will be partially or totally lost.

Accordingly, there is presented the need for a free electron laser configuration wherein the growth of $x_\beta$ and $x_\beta'$ is limited, either to reduce the cost and complexity of single pass gain-expanded FEL systems or to improve the power output, efficiency, and gain of gain-expanded storage ring FEL systems.

SUMMARY OF THE INVENTION

The present invention provides a high gain tunable gain-expanded free electron laser wherein the period and amplitude of the periodic magnet, the optical mode, and the transverse gradient of the periodic magnetic field are chosen to suppress the excitation of the betatron motion while retaining the energy-independent phase-match of the basic gain-expanded free electron laser.

Broadly, these objectives are accomplished in the present invention by restricting the optical phase slip and the betatron phase advance per unit length to a specific set of values to suppress the betatron excitation, and by using an optical mode configuration and a magnet configuration in which the coupling of the electrons' transverse velocity to the optical field varies as a function of transverse position in the electron beam to provide small signal gain.

More particularly, to suppress the betatron excitation, the net phase slip qL and the net betatron phase advance are constrained in the invention to satisfy the following conditions:

$$|qL| = K\pi$$

$$|qL - \bar{\Lambda}L| = M2\pi$$

where K is an integer and M is any positive integer. To provide small signal gain, the integer K is further restricted to odd values, and the optical electric field or nominal transverse velocity must be made to vary with transverse position. A first embodiment of the invention has a wiggler magnet configuration wherein the period, amplitude, and gradient are constant along the beam direction, with the electron beam axis offset from the optical axis to provide small signal gain via the transverse variation of the optical electric field. In a second embodiment of the invention, the electron beam and optical axes are coincident, and small signal gain is achieved by adding a second periodic component to the magnet system to make that component of the electron transverse velocity which interacts with the optical electric field decrease with increasing electron energy.

According to a further aspect of the present invention, the laser system is provided with the capability of being tuned. In a gain-expanded FEL with a fixed transverse magnetic gradient, the ability to vary the output wavelength by varying the electron energy is lost since the magnet is explicitly designed to maintain $v_{par}$=constant independent of energy. The present invention overcomes this limitation by providing a controllably variable magnetic field and magnetic field gradient. The required variation in magnetic field may be implemented by changing the current or gap spacing of the magnet poles producing the constant component of the field in the wiggler magnet. The variation in gradient may be provided by the use of split pole magnets where the poles are split into two separately excited segments producing differing transverse gradients.

For a further understanding of the nature and advantages of the present invention, reference should be made to the remaining portions of the specification and the attached drawings.

BRIEF DESCRIPTION OF THE DRAWINGS

FIG. 1A is a schematic plan view of a gain-expanded storage ring free electron laser system;

FIG. 1B is a schematic plan view of a single pass gain-expanded free electron laser system;

FIG. 2 illustrates the basic gain-expanded magnet configuration;

FIG. 3 illustrates the relationship of the electron beam and the laser mode in a first embodiment of the invention;

FIG. 4 illustrates the magnet configuration in a second embodiment of the invention;

FIG. 5 illustrates the relationship of the optical mode and the electron beam in the second embodiment; and FIG. 6 illustrates a split pole magnet for variation of the magnetic gradient in a tunable excitation cancelling free electron laser.

DESCRIPTION OF THE PREFERRED EMBODIMENTS

Basic Configuration

FIG. 1A is a schematic view of a storage ring free electron laser system 10 utilizing the basic gain-expanded configuration disclosed in the above-mentioned copending U.S. patent application Ser. No. 55,163. The principles of operation and a more detailed description of the construction of laser system 10 are set forth in the above-mentioned U.S. Pat. No. 3,822,410 and copending U.S. patent application Ser. No. 55,163, both of which discloses are hereby incorporated by reference.

A relativistic electron beam 12, having been generated by any convenient means such as a particle accelerator (not shown) is introduced into a laser section 15 along an axis 17 which is parallel to the optical axis of the system. The electrons in beam 12 have a mean energy $\gamma mc^2$ where m is the electron mass, c is the speed of light, and $\gamma = 1/\sqrt{1 - (v/c)^2}$. Laser section 15 comprises a wiggler magnet system having plurality of magnets 20 configured to produce a spatially alternating magnetic field so that beam 12 is caused to undergo undulating transverse motion. Magnets 20 are shown in barest schematic form, with the particular configurations for the various embodiments being shown in other figures to be described below. Beam 12 is circulated in a storage ring having an injection section 25a and an extraction section 25b so that the beam may make multiple passes through laser section 15. Between extraction and injection, beam 12 is passed through an RF accelerating cavity 30 which restores to the beam the energy lost in laser section 15. Laser system 10 may be operated as an amplifier or an oscillator. Laser mirrors 31 are shown as defining a resonant optical cavity for oscillation.

Electrons circulating through the storage ring follow trajectories which are, in general, displaced in transverse position from the design orbit in proportion to their derivation in energy from the design energy. The ratio of the electrons' nominal transverse displacement x to their fractional energy displacement $\delta = (\gamma - \gamma_0)/\gamma_0$ from the design energy $\gamma_0$ defines the dispersion function η. The value of the dispersion function η and its dependence on position around the storage ring and the laser section is determined by the specific configuration of bending and focusing magnets in the ring and laser section.

Immediately prior to entry into laser section 15, beam 12 is passed through a matching section 35 designed to focus the beam at the entrance of laser section 15 and adjust the electrons' transverse positions to match the intrinsic dispersion function of the laser section. The relation of the electrons' transverse coordinates and energy is indicated symbolically by two separate trajectories 40a and 40b of two electrons having respective energies $\delta_a$ and $\delta_b$. After the dispersed electrons have traversed laser section 15, they are passed through a second matching section 45 which shifts the electrons' transverse positions to match the dispersion function of the ring. A typical value of η is on the order of 1.0 cm, whereupon a beam having a 3% rms variation in energy would have an rms transverse radius of about 0.3 mm. It should be noted that the periodic transverse motion is exaggerated in FIGS. 1A-B since the displacements are typically on the order of microns.

FIG. 1B is a schematic view of a single pass free electron laser, which differs from the configuration of FIG. 1A in that a given electron only passes through the laser once. Like reference numerals are used for corresponding elements. A particle accelerator 46 produces a beam at the design energy. The beam is directed to an injection system 47a which directs the beam into laser section 15. At the end of the laser section, an extraction system 47b directs the beam to a decelerator and beam dump 48 in which the kinetic energy may be recovered to improve efficiency.

In the basic gain-expanded configuration, the magnetic field provided by wiggler magnets 20 is characterized by a transverse gradient in order that the electrons which are spatially classified according to energy move through regions of different magnetic field or at differing angles relative to axis 17. In the discussion that follows, the electrons will be assumed to move along the z axis, and the magnetic field will be assumed to be parallel to the y axis. The length of laser section 15 is assumed to be L(cm), extending from $z=-L/2$ to $z=L/2$. In principle, many possible field configurations can be employed to produce the dispersion, focusing, and equalization of longitudinal velocities required for this invention. As an example, the transverse gradient can be introduced either separately or as part of the periodic laser magnet. The function of the invention is unaffected by the field configuration so long as the field leads to the appropriate equations of motion for the electron energy, transverse position, and optical phase.

Indeed, there is no requirement that the transverse field be a magnetic field—a suitably configured electric field parallel to the x axis would have the equivalent result. As a practical matter, magnetic fields are likely to be preferred, although it may be convenient to provide certain (possibly small) components of the total field by means of an electric rather than a magnetic field.

As will be discussed below, the present invention achieves the suppression of betatron excitation by imposing certain constraints on the optical phase slip. However, when the free electron laser is operated as an oscillator, the operating wavelengths will tend to evolve toward the wavelength for maximum gain, which may not be consistent with the optical phase slip required for limitation of the amplitude of the betatron motion. In such a case it is necessary to stabilize the frequency of the oscillator by using an intra-cavity dispersive element or a selective absorber, or by injection locking.

First Embodiment

A first embodiment of the invention utilizes a wiggler magnet system having a constant period. It is convenient, although not necessary, to assume that the gradient is incorporated within the periodic field, leading to a field of the form:

$$B = \sqrt{2} B_0 (1+kx) \cos(2\pi z/\lambda_q) + B_c(1+sx) \qquad (2\text{-}1)$$

where $B_0$ = rms amplitude of the periodic field component at $x=0$ (gauss)

$k$ = transverse gradient of the fundamental periodic field component (cm$^{-1}$)

$B_c$ = amplitude of the constant field component at $x = 0$ (gauss)

$\quad = \dfrac{mc^2}{e} \dfrac{\alpha^2 B^2}{\gamma_0} k$ $s$ = transverse gradient of the constant field component (cm$^{-1}$)

$\quad = k/(1 + \alpha^2 B^2)$ $\alpha^2 B^2 = \left(\dfrac{e}{mc^2}\right)^2 \left(\dfrac{\lambda_q B_0}{2\pi}\right)^2$ This configuration of magnetic field is consistent with a linear dependence of electron energy on transverse position. More particularly, the nominal electron energy γ(x) as a function of mean transverse coordinate x within the laser section is given by:

$$\gamma(x) = \gamma_0 (1 + x/\eta) \qquad (2\text{-}2)$$

where $\gamma_0 mc^2$ = design electron energy (ergs)

$\quad$ = nominal electron energy at $x = 0$ $\eta$ = intrinsic dispersion constant of the laser section $\quad = \left(\dfrac{1}{k-s}\right) = \dfrac{1+\alpha^2 B^2}{\alpha^2 B^2}\left(\dfrac{1}{k}\right)$ It should be noted that Equation (2-2) refers to the average transverse position x in the periodic magnet, where the average is to be taken over the magnet period $\lambda_q$. The periodic reversals of magnetic field will result in microscopic periodic motion about the mean position.

FIG. 2 is a schematic representation of wiggler magnet system to produce such a magnetic field. The magnet system includes two interleaved pluralities of magnets, the magnets in each plurality being designated 50 and 52. Magnets 50 alternate in polarity to define the periodic field having rms amplitude $B_0$ and period $\lambda_q$. Magnets 52 have their poles aligned to define the constant field component. Each of magnets 50 and 52 has tapered pole faces so that the magnetic field varies linearly with transverse coordinate. Generally, magnets 50 will have a particular angle of taper while magnets 52 will have a different angle to provide a different transverse gradient. The amplitudes of the periodic and constant components are defined and controlled by the currents supplied to the field windings of the magnets or, if permanent magnets are employed, by the magnetization of the poles. While this configuration of magnets can be expected to give rise to higher order odd harmonic terms in B(z), such harmonics are usually small, and in any event, do not alter the basic operation of the invention.

Equations of Motion

The above magnet configuration provides the conditions required for the operation of a gain-expanded free electron laser, but does not specifically define the excitation cancelling system of the present invention. An understanding of the suppression of excitation of the betatron motion is best achieved by reference to the equations of motion and the effects of the coefficients in these equations on the electron transverse coordinates $x(z)$ and $dx/dz$, the electron fractional deviation from nominal energy $\delta$, and the phase angle $\psi$ between the electric field and the electron transverse velocity.

Assuming the magnetic field and dispersion indicated in Equations (2-1) and (2-2), the averaged electron coordinates $x$, $\delta$, and $\psi$ evolve during the interaction (that is, have z dependence) as follows:

$$\frac{d^2x}{dz^2} = -\eta \tilde{\Lambda}^2 \left[ \frac{x}{\eta} - \delta(1+sx) \right](1-2\delta) - 2\frac{dx}{dz}\frac{d\delta}{dz} \quad (3\text{-}1)$$

$$\frac{d\delta}{dz} = \frac{e|\epsilon|}{2\gamma_0 mc^2}\left(\frac{\lambda_q}{2\pi\rho_0}\right)[J_{(N-1)/2}(N\xi) - J_{(N+1)/2}(N\xi)] \cdot \quad (3\text{-}2)$$

$$(1+gx)(1+kx)(1-\delta)\sin\psi$$

$$\frac{d\psi}{dz} = q + \frac{4\pi}{\lambda}(1-v_{par}/c)\left[\delta(1+\delta)\frac{x}{\eta}\right] - \quad (3\text{-}3)$$

$$\left(\frac{\omega}{2c}\right)\left(\frac{dx}{dz}\right)^2$$

where $J_{(N-1)/2}, J_{(N+1)/2}$ = cylindrical Bessel functions of order $(N-1)/2$, $(N+1)/2$ $x$ = averaged electron transverse position (cm)

$\delta \equiv (\gamma-\gamma_0)/\gamma_0$ $\psi$ = phase angle between optical electric field and electron transverse velocity $\omega$ = optical frequency of the laser = $2\pi c/\lambda$ (sec$^{-1}$)

$\omega_0$ = fundamental optical frequency for wiggler magnet $\approx 2\pi c/[\lambda_q(1-v_{par}/c)]$ (sec$^{-1}$)

$N$ = harmonic number for the optical field = $\omega/\omega_0$ $\epsilon$ = amplitude of the optical electric field (statvolts/cm)

$g$ = transverse gradient of optical electric field = $\frac{1}{\epsilon}\frac{d\epsilon}{dx}$ (cm$^{-1}$)

$\rho_0 \equiv$ characteristic gyro radius = $\gamma_0 mc^2/(\sqrt{2}eB_0)$ (cm)

$\xi \equiv (\alpha^2 B^2/2)/(1+\alpha^2 B^2)$ $\tilde{\Lambda}$ = spatial frequency of free betatron oscillations (betatron phase advance per unit length)

$\approx (1 + \alpha^2 B^2)^{\frac{1}{2}}/(\eta\gamma_0)$ (cm$^{-1}$)

$q$ = rate of change of phase angle $\psi$ for electrons drifting through interaction region with $\epsilon = x_\beta = x_\beta' = 0$ (optical phase slip per unit length)

$= (2\pi N/\lambda_q) - (\omega/c)(1 - v_{par}/c)$ (cm$^{-1}$)

e, m, c, $\gamma_0$, $\lambda_q$, $\eta$, $v_{par}$ have already been defined. These equations are derived from the Lorentz Force equation neglecting terms of order $(\lambda_q B_c)/(\rho_0 B)$ and $(k\lambda_q/\rho_0)^2$ and assuming $\delta << 1$ and $(x/\eta << 1$. Although the non-linear terms proportional to $x^2$, $\delta^2$, and $x\delta$ depend on the assumed form of the magnetic field, these terms are small, and are not a factor in the operation of the present invention. A fuller discussion of these equations may be found in Volume 7 of the textbook entitled "Physics of Quantum Electronics" (M. Sargent, M. Sculley, H. Pilloff, and R. Spitzer, editors), published 1980 by Addison-Wesley.

Starting from the initial conditions at the beginning of the interaction, the equations of motion can be integrated to determine the electron coordinates at the end of the interaction. When this is done, either explicitly or formally, the betatron amplitude at the end of the interaction can be seen to depend on the relative magnitudes of q and $\Lambda$. The betatron amplitude at the end of the interaction can be minimized by optimizing these quantities.

The significant features of the solutions to Equations (3-1), (3-2), and (3-3) can be demonstrated in a linear approximation where $\gamma$ and $x$ are evaluated as functions of z to first order in the optical electric field $\epsilon$. Assuming on-axis initial motion, that is, $x_\beta = x_\beta' = 0$, the first order betatron coordinates at the ends of the interaction region assume the following form:

$$x_\beta = \eta \frac{e|\epsilon|}{\gamma_0 mc^2}\left(\frac{\lambda_q}{2\pi\rho_0}\right)[J_{(N-1)/2} - J_{(N+1)/2}]\frac{1}{q^2 - \tilde{\Lambda}^2} \cdot \quad (3\text{-}4)$$

$$[q\cos(\tilde{\Lambda}L + \psi_0) - (q - \tilde{\Lambda})\sin\psi_0\sin\tilde{\Lambda}L - q\cos(qL + \psi_0)]$$

$$x_\beta' = \eta\frac{e|\epsilon|}{\gamma_0 mc^2}\left(\frac{\lambda_q}{2\pi\rho_0}\right)[J_{(N-1)/2} - J_{(N+1)/2}]\frac{\tilde{\Lambda}}{q^2 - \tilde{\Lambda}^2} \cdot \quad (3\text{-}5)$$

$$[q\sin(\tilde{\Lambda}L + \psi_0) - (q - \tilde{\Lambda})\sin\psi_0\cos\tilde{\Lambda}L - q\sin(qL + \psi_0) + (q - \tilde{\Lambda})\sin(qL + \psi_0)]$$

where $\psi_0$ = initial value of $\psi$

It can be seen from Equations (3-4) and (3-5) that the cancellation of betatron excitation can be achieved if the net optical phase slip qL and the betatron phase advance $\tilde{\Lambda}L$ are chosen to satisfy the following conditions:

$$|qL| = K\pi \quad (3\text{-}6)$$

$$|qL - \tilde{\Lambda}L| = M2\pi \quad (3\text{-}7)$$

where K is an integer and M is a positive integer. As will be shown below, K must in fact be an odd integer to produce small signal gain. The constraints of Equations (3-6) and (3-7) are incorporated into the magnetic field structure by first choosing the operating wavelength and/or electron energy and magnetic field strength to satisfy the constraint on q, and then choosing the dispersion constant $\eta$ to generate a value of $\bar{\Lambda}L$ differing from qL by an integral multiple of $2\pi$.

The application of these constraints can be illustrated by considering the design of an excitation cancelling gain-expanded FEL for operation at an optical wavelength $\lambda=0.4$ microns (in the visible portion of the spectrum). Assuming a net betatron phase advance $\bar{\Lambda}L=\pi$ radians and a net optical phase slip $qL=3\pi$ radians, a magnet period $\lambda_q=50.0$ cm, a normalized magnetic field strength $\alpha^2 B^2=4.0$, and an overall magnet length L=20 meters, the required electron energy, magnetic field strength, and gradient are:

$\gamma_0=1612$ ($E=823$ MeV)

$B_0=430$ gauss $k=1.4$ cm$^{-1}$

The resulting intrinsic dispersion function $\eta$, constant field $B_c$, and constant field gradient s are:

$\eta=0.88$ cm $B_c=6.0$ gauss $s=0.33$ cm$^{-1}$.

Although the conditions on qL and $\bar{\Lambda}L$ in Equations (3-6) and (3-7) are sufficient to suppress the excitation of $x_\beta$ and $x'_\beta$, they are not necessarily consistent with the efficient amplification of light by the electrons. As in all free electron lasers, the small signal gain per pass in the excitation-cancelling gain-expanded FEL of the present invention is proportional to the phase-averaged second order change in electron energy during the interaction:

$$G \equiv \text{optical gain per pass} \quad (4-1)$$

$$= -\frac{\gamma_0 mc^2}{e} \frac{i}{SA} <\delta_2>$$

where

S = optical power density in interaction region $= \frac{\epsilon^2}{8\pi} c$ (ergs/cm$^2$)

A = area of optical mode in plane normal to optical axis and electron beam axis (cm$^2$)

i = electron current (statcoulombs/sec)

$<\delta_2>$ = phase averaged second order (in $\epsilon$) fractional change in electron energy during interaction.

Assuming that $x_\beta$ and $x_\beta'$ have been cancelled to first order, solution of Equations (3-1), (3-2), and (3-3) reveals that the first and second order changes in energy $\delta_1$ and $\delta_2$ are related by the equation:

$$<\delta_2> = \frac{1}{2} \frac{\partial}{\partial \delta} <\delta_1^2> \quad (4-2)$$

where $\delta_1$ is the first order (in $\epsilon$) fractional change in energy during the interaction, and the derivative is taken with respect to the initial energy assuming zero initial betatron excitation, that is, $x_{initial}=\eta\delta_{initial}$.

The first order energy shift $\delta_1$ can be computed simply by integrating Equation (3-2):

$$\delta_1 = \frac{e|\epsilon|}{2\gamma_0 mc^2} \left(\frac{\lambda_q}{2\pi\rho_0}\right) [J_{(N-1)/2} - J_{(N+1)/2}] \cdot \quad (4-3)$$

$$\frac{(1 + kx + gx - \delta)}{q} [\cos(\psi_0 + qL) - \cos\psi_0]$$

Note that $\delta_1=0$ for $|qL|=2\pi, 4\pi$, etc., and assumes a series of local maxima for $|qL|=\pi, 3\pi$, etc. It follows from Equations (4-2) and (4-3) that small signal gain in an excitation cancelling gain-expanded free electron laser can be obtained only at the odd-$\pi$ values of qL, that is, $|qL|=\pi, 3\pi$, etc.

The energy derivative in Equation (4-2) is determined primarily by the transverse gradient g of the optical field in Equation (3-2). From Equation (4-3), we have explicitly, $$<\delta_2> = \frac{1}{2} \frac{\partial}{\partial \delta} <\delta_1^2> \approx \quad (4-4)$$

$$\left(\frac{e\epsilon}{\gamma_0 mc^2}\right)^2 \left(\frac{\lambda_q}{2\pi\rho_0}\right)^2 [J_{(N-1)/2} - J_{(N+1)/2}]^2 \frac{g}{q^2}$$

Since $<\delta_2>$ (and hence the small signal gain) is proportional to the optical field gradient g, the electron beam in this embodiment must pass through the interaction region at a transverse position where the optical field has a finite gradient. The magnitude and sign of the gradient g in Equation (4-4) depends on the optical mode present in the interaction region, and on the relative transverse positions of the axes of the optical mode and the electron beam. For a gaussian TEM$_{00}$ mode, a gradient can most easily be introduced by displacing the axis of the optical resonator relative to the electron beam so that the electron beam passes through the mode at a radius comparable to the waist w$_0$ of the mode. This arrangement is illustrated schematically in FIG. 3, which shows beam axis 17 displaced relative to the optical axis, designated 56.

In selecting the displacement of the optical mode axis and electron beam axis, attention must be given to both the transverse optical field gradient and the magnitude of the optical field. Since the gain is proportional to the derivative of the mean squared first order energy shift, the displacement chosen must optimize the product of the transverse optical gradient and the mean squared optical field.

The fundamental TEM$_{00}$ optical mode propagates in free space as:

$$\underline{\epsilon}(\rho,z) = \frac{w_0}{w(z)} \exp(-\rho^2/w^2(z)) \exp[i(\omega(z-ct) - \arctan(z/z_R))] \quad (4-5)$$

where $w(z) = w_0(1 + (z/z_R)^2)^{\frac{1}{2}}$

-continued $z_R \equiv$ Rayleigh Range $= \pi w_0^2/\lambda$

The parameter w(z) in Equation (4-5) is usually used to define the radius of the optical mode. As is evident from the equation, the radius depends on both the axis position z and the Rayleigh range $z_R$. For most applications, the Rayleigh range $z_R$ will be chosen to optimize the gain by minimizing the average mode cross-section A in the interaction region.

$$A(z) \equiv \int \epsilon^2(\rho) dA / [\epsilon^2(\rho = 0)] = \pi w^2(z)/2$$

$$\overline{A} = \frac{1}{L} \int_{-L/2}^{L/2} A(z) \, dz$$

$$\overline{A}_{min} = \lambda L/(2\sqrt{3})$$

For a 20-meter interaction length at a wavelength $\lambda = 0.4$ μm, the optimum mode cross-section would be of the order $\overline{A} \sim 2.3$ mm$^2$, corresponding to an average mode radius $w \sim 1.0$ mm. The optimum displacement of the electron beam and optical mode axes will, in general, be comparable to the optical mode radius.

For most applications, the electron beam radius will be comparable to or smaller than the displacement of the optical mode and electron beam axes, so that the values of the optical transverse gradient and mean squared amplitude, and their product, will remain substantially constant over the cross-section of the electron beam. As an example, the electron beam width in a gain-expanded wiggler with an intrinsic dispersion function $\eta = 1.0$ cm and a 3% rms energy spread would be 0.3 mm.

Note that the sign of the gradient g, and hence the sign of the second order energy change $<\delta_2>$ in this embodiment will depend on the side of the laser mode through which the electron beam is made to pass. To insure gain in this embodiment, the optical field seen by the electrons must decay in the direction of higher magnetic field in the wiggler magnet system.

Higher order optical modes could, of course, also be adopted for use with the invention, although in all cases the axis of the mode will have to be displaced from the axis of the electron beam to secure gain.

The transverse gradient of the optical field in Equation (3-2) makes the coupling of the electrons' energy to the optical field a function of transverse position, and hence, for $x_{\beta,initial} = 0$, a function of initial energy $\delta_{initial}$. This coupling leads, in the first order energy change $\delta_1$, to a term linear in $\delta_{initial}$, which leads to gain through Equation (4-2).

While this embodiment effectively cancels the first order transverse excitation of $x_\beta$ and $x_\beta'$ (typically effecting a reduction by two orders of magnitude), preserves energy-independent phase-match, and produces good optical gain, the relative displacement of the optical mode and electron beam axes may result in some deterioration of optical mode quality. To minimize the distortion of the incident optical mode during amplification in a laser, the amplifying medium should symmetrically fill the entire radial cross-section of the optical mode. The intentional radial displacement of the optical mode and electron beam axes in the first embodiment of the invention obviously violates this ideal, and will tend to distort the mode by selectively amplifying the side of the mode through which the electron beam is made to pass.

Several means exist to reduce this distortion. In an oscillator, the resonator mirrors can be designed to filter out the higher order mode content responsible for mode distortion by choosing a mirror radius comparable to the radius of the fundamental TEM$_{00}$ mode. Since the higher order modes have uniformly larger radii than the TEM$_{00}$ mode, more power will be lost by diffraction around the mirror edges for the higher order modes than for the TEM$_{00}$ mode, reducing the relative content of the higher order modes.

Second Embodiment

Mode distortion can also be reduced by modifying the laser magnet to permit laser operation with coaxial electron beam and optical mode axes. As will be described below, the wiggler magnet system in a second embodiment has interspersed sections with different field amplitude, period, and gradient. While the magnet structure required for this embodiment of the invention is more complicated than the embodiment just discussed, the mode distortion produced by this embodiment will always be symmetric relative to the mode axis. This symmetric distortion may, under certain circumstances, be preferable to the asymmetric distortion introduced by the first embodiment of the invention.

In the second embodiment of the invention, the coupling of the electron energy and the optical field is made energy-dependent by changing the transverse gradient of the periodic magnetic field in which the electrons and light interact.

Inspection of Equation (3-2) indicates that in addition to the optical field's transverse variation, proportional to (1+gx), both the transverse wiggler field amplitude and the energy offset appear as first order terms, respectively, as (1+kx) and (1−δ). Taken individually, the transverse field variation (1+kx) would increase the coupling of the electron beam to the optical field at high energy, leading to absorption, while the first order energy variation (1−δ) would lead to amplification. Appearing together, the two terms cancel to order s/(k−s), and make only a small net contribution to the magnitude of $<\delta_2>$.

In the second embodiment of the invention, the magnitude and/or sign of k in Equation (3-2) is altered by changing the wiggler design. In this alternate embodiment, the gradient of the optical field g is set equal to zero, and the gain becomes proportional to the term (1−ηk). Whereas ηk is always close to 1 in the first embodiment of the invention, values substantially smaller or larger than 1, and with the opposite sign are possible in the second embodiment of the invention.

FIG. 4 is a schematic representation of the wiggler magnet system for the second embodiment of the invention. The magnet system includes alternating sections 60 and 62 having respective lengths $l_1$ and $l_2$. Section 60 includes interleaved first and second pluralities of magnets having, respectively, magnets 50 of alternating polarity and magnets 52 of non-alternating polarity (as in FIG. 2). Section 62 includes interleaved pluralities of magnets having magnets 50' of alternating polarity and magnets 52' of non-alternating polarity. Section 60 provides the basic periodic component of the magnetic field, with period $\lambda_q$, while section 62 provides a second supplementary periodic component. The two periodic components of the magnet are assumed to have magnetic field amplitudes B and gradients k which can be varied independently. As in the first embodiment of the invention, the magnet includes a constant component $B_c$ with gradient s which is assumed to be present in both the basic and supplementary components of the magnetic field. A cell 63 contains one section 60 of the basic periodic magnet and one adjacent section 62 of the supplementary periodic magnet. The completed magnet assembly 15 comprises a series of cells 63 assembled end-to-end.

In the first embodiment of the invention, the gradient k of the periodic field was determined by the requirement that the average longitudinal velocity $v_{par}$ remain a constant, independent of energy when averaged over the magnet period $\lambda_q$. In the first embodiment, the magnetic field strength was required to increase with energy, essentially in proportion to $(1+\eta\delta)$, to keep the ratio $(1+\alpha^2B^2)/\gamma^2$ constant. In the second embodiment of the invention, the requirement of constant longitudinal velocity is satisfied by keeping the value of $(1+\alpha^2B^2)/\gamma^2$ constant when averaged over cell 63 (defined above to include one basic and one supplementary magnet section). Specifically, the values of magnetic field in the two components of the wiggler must be chosen to satisfy the condition:

$$\frac{<1+\alpha^2B^2>}{2\gamma^2} \simeq (1 - v_{par}/c) \qquad (5\text{-}1)$$

$$= \text{constant, independent of energy.}$$

The brackets $<\ >$ in Equation (3-12) define the average over z along each nominal trajectory over a distance in z corresponding to the length of cell 63.

The use of a supplementary component to the magnetic field in the second embodiment of the invention permits the gradient k in the basic component of the magnet to be varied at will subject to the condition that a sufficient gradient can be incorporated in the supplementary component to maintain constant longitudinal velocity.

An additional constraint on the supplementary periodic component of the field is imposed by the requirement that no energy be gained or lost by the electrons while moving through the supplementary field. This condition can be satisfied by requiring that the optical phase slip in passing through each period of supplementary magnet section 62 be an odd multiple of $2\pi$ radians, and that each supplementary magnet section has an integral number of periods. If this condition is satisfied, the supplementary magnet sections act only to maintain constant longitudinal velocity, and alter only the focusing properties of the magnet and the intrinsic dispersion function $\eta$.

Provided the individual magnet sections in FIG. 4 are short compared to the betatron period $2\pi/\tilde{\Lambda}$, excitation concellation can be achieved in this embodiment with the same constraints on qL and $\tilde{\Lambda}$L as in Equations (3-6) and (3-7), provided that $\tilde{\Lambda}$, $\eta$ and $B_c$ are defined in terms of averages of $\alpha^2B^2$, k, and s over the basic magnet cell. For the magnet shown in FIG. 4, the definitions are modified as follows:

$$\tilde{\Lambda} \simeq \frac{<\alpha^2B^2k(k-s)>}{\gamma^2} \qquad (5\text{-}2)$$

$$\eta^2 \simeq \frac{<1+\alpha^2B^2>}{<\alpha^2B^2k(k-s)>}$$

$$B_c \simeq \frac{mc^2}{e} \frac{<\alpha^2B^2k>}{\gamma}$$

The optical phase slip per unit length q in this embodiment assumes the value $$q \simeq \frac{l_1}{l_1+l_2}\left(\frac{2\pi}{\lambda_q} - \frac{1+\alpha^2B^2}{2\gamma^2}\frac{2\pi}{\lambda}\right) \qquad (5\text{-}3)$$

where $\alpha^2B^2$ and $\lambda_q$ are the normalized magnetic field strength and period in section 60. Given these revised definitions, the second order change in $\delta$ for this second embodiment of the invention is:

$$<\delta_2> = \qquad (5\text{-}4)$$

$$\frac{1}{2}\frac{\partial}{\partial\delta}<\delta_1^2> \simeq \left(\frac{e\epsilon_0}{\gamma_0mc^2}\right)^2\left(\frac{\lambda_q}{2\pi\rho_0}\right)^2 [J_{(N-1)/2} -$$

$$J_{(N+1)/2}]^2\left(\frac{\eta k-1}{q^2}\right)\frac{l_1^2}{(l_1+l_2)^2}$$

where $\rho_0$, k, and $\lambda_q$ refer to the gyro radius, gradient, and period in section 60 of the magnet, while $l_1$ and $l_2$ define, respectively, the lengths of the sections 60 and 62 of the magnet.

To optimize the gain, $<\delta_2>$ should be large and negative (see Equation (4-1)), which is possible only when $\eta k<1$, or equivalently, $k<1/\eta$. While in the first embodiment, k was always somewhat greater than $1/\eta$, specifically, $k=[(1+\alpha^2B^2)/(\alpha^2B^2)](1/\eta)$, the introduction of supplementary magnet section 62 permits the gradient k in section 60 to be reduced to values smaller than $1/\eta$, or even to values less than zero.

Variation of Wavelength

One of the highly desirable features of the basic free electron laser is its tunable characteristics. As can be seen in Equation (1-2), the operating wavelength can be changed by changing either the magnetic field strength or the energy of the incoming electrons. However, since a gain-expanded magnet structure is designed specifically to maintain the phase-match condition at the operating wavelength as the electron energy is changed, it is no longer possible to tune the wavelength by changing only the electron energy. Rather, if it is desired to operate a gain-expanded free electron laser at a given wavelength, the following three conditions must be met:

(1) The nominal operating energy $\gamma_0mc^2$ and/or magnetic field strength must be changed to yield the required optical phase slip per unit length as defined in the equations of motion.

(2) The constant component $B_c$ of the magnetic field must be altered to permit electrons with the nominal operating energy to propagate through the magnet at x=0. Thus, if the magnetic field is generated by electromagnets, the power supplies for the field windings for constant field magnets 52 and 52' must be adjustable as required over the range of operating wavelength for the laser.

(3) The magnet gradients k and s in each pole of laser section 15 must be changed in proportion to $\gamma_0/(1+\alpha^2B^2)^{\frac{1}{2}}$ to preserve the value of $\tilde{\Lambda}$ required to limit the growth of the betatron amplitude. Thus, each magnet must be constructed so that its transverse gradient can be adjusted. FIG. 6 is a schematic representation of a split pole magnet 70, which could be used to provide the periodic or constant component. Magnet 70 includes first and second adjacent segments 70a and 70b which, while having the same polarity, are characterized by different angles of taper. Segment 70a includes tapered pole faces 72a and 72a' with associated windings 75a and 75a'. Segment 70b includes tapered pole faces 72b and 72b' with associated windings 75b and 75b'. Thus, adjustment of the relative excitation of the windings of magnet segments 70a and 70b permits the gradient to be varied between the limits obtainable by operation of either one individually. Alternately, a variation in gradient can be achieved by providing for mechanical adjustment of the opening angle of the pole faces.

Conclusion

In summary it can be seen that the present invention provides a mechanism for limiting the transverse excitation and thus permitting the maximum benefits of the gain-expanded configuration to be enjoyed. In view of the fact that the methods of limiting the growth of the transverse betatron motion within the laser interaction region have the effect of reducing the small signal gain, additional techniques have been disclosed for then optimizing the small signal gain.

While the above provides a full and complete disclosure of the preferred embodiments of the present invention, various modifications, alternate constructions and equivalents may be employed without departing from the true spirit and scope of the invention. For example, while the techniques for optimizing the small signal gain are most evidently desirable in a system with excitation cancellations, these techniques could be used effectively to augment the small signal gain for systems without excitation cancellation. Additionally, while typical systems are operated at the fundamental optical wavelength (N=1), operation at the odd order harmonics is possible without loss of performance. Therefore, the above description and illustration should not be construed as limiting the scope of the invention which is defined by the appended claims.

I claim:

1. In a gain-expanded free electron laser including
means for providing an evacuated channel having a longitudinal axis,
means for injecting a relativistic electron beam characterized by a design energy $\gamma_0 mc^2$ into said channel in a direction generally parallel to the axis of said channel,
means for supporting an electromagnetic wave in at least a region of said channel, which electromagnetic wave is characterized by an optical axis generally parallel to the axis of said channel, and by an optical phase,
means for dispersing the electrons in transverse position at the entrance to said channel in proportion to said electrons' deviations in energy from said design energy,
magnet means for generating a magnetic field perpendicular to the axis of said channel, said magnetic field having
a periodic component $B_0$ which reverses periodically along said axis, though remaining constant in time, said periodic component being used to impart a periodic transverse motion and velocity to said electrons in said electron beam,
said periodic component being characterized by a transverse gradient k perpendicular to said magnetic field and the axis of said channel wherein said gradient k and said dispersing means are used to selectively increase the transverse velocity of high energy electrons moving through said magnet means thereby maintaining constant longitudinal velocity for all electrons independent of initial energy,
said transverse gradient k in said periodic field deflecting said electrons towards a direction of lower magnetic field, and
a non-reversing component $B_c$ with transverse gradient s, said non-reversing component opposing the deflection of said electron beam by said periodic component, said gradient s preserving the dispersion in energy and transverse position established at the start of said magnet means,
said evacuated channel, said supporting means, and said magnet means defining an interaction region of length L in which said electromagnetic wave exchanges energy with said electron beam,
said magnet means, said electromagnetic wave, and said electron beam being characterized by a net optical phase slip qL during the interaction between the phase of said electromagnetic wave and the phase of said electron transverse velocity, and a spatial frequency $\bar{\Lambda}$ for free betatron oscillations about the electrons' nominal trajectories, thereby defining a net betatron phase advance $\bar{\Lambda}L$,
wherein said net optical phase slip qL and said betatron phase advance $\bar{\Lambda}$ satisfy the following conditions:

$$|qL| = K\pi$$

$$|qL - \bar{\Lambda}L| = M2\pi$$

where K is an integer and M is any positive integer, whereupon the excitation of the betatron motion excited during the passage of said electrons through said interaction region is suppressed, the improvement wherein:
said optical axis is displaced transversely relative to the axis of said electron beam to create a transverse gradient in the optical electric field in the region through which said electron beam passes, thereby enhancing the small signal gain.

2. The invention of claim 1 wherein said free electron laser is a storage ring laser.

3. The invention of claim 1 wherein said free electron laser is a single pass laser.

4. The invention of claim 1 wherein said magnetic field has a constant period over said interaction region.

5. In a gain-expanded free electron laser including
means for providing an evacuated channel having a longitudinal axis,
means for injecting a relativistic electron beam characterized by a design energy $\gamma_0 mc^2$ into said channel in a direction generally parallel to the axis of said channel,
means for supporting an electromagnetic wave in at least a region of said channel, which electromagnetic wave is characterized by an optical axis generally parallel to the axis of said channel, and by an optical phase, means for dispersing the electrons in transverse position at the entrance to said channel in proportion to said electrons' deviations in energy from said design energy, magnet means for generating a magnetic field perpendicular to the axis of said channel, said magnetic field having a periodic component $B_0$ which reverses periodically along said axis, though remaining constant in time, said periodic component being used to impart a periodic transverse motion and velocity to said electrons in said electron beam, said periodic component being characterized by a transverse gradient k perpendicular to said magnetic field and the axis of said channel wherein said gradient k and said dispersing means are used to selectively increase the transverse velocity of high energy electrons moving through said magnet means thereby maintaining constant longitudinal velocity for all electrons independent of initial energy, said transverse gradient k in said periodic field deflecting said electrons towards a direction of lower magnetic field, and a non-reversing component $B_c$ with transverse gradient s, said non-reversing component opposing the deflection of said electron beam by said periodic component, said gradient s preserving the dispersion in energy and transverse position established at the start of said magnet means, said evacuated channel, said supporting means, and said magnet means defining an interaction region of length L in which said electromagnetic wave exchanges energy with said electron beam, said magnet means, said electromagnetic wave, and said electron beam being characterized by a net optical phase slip qL during the interaction between the phase of said electromagnetic wave and the phase of said electron transverse velocity, and a spatial frequency $\tilde{\Lambda}$ for free betatron oscillations about the electrons' nominal trajectories, thereby defining a net betatron phase advance $\tilde{\Lambda}L$, wherein said net optical phase slip qL and said betatron phase advance $\tilde{\Lambda}$ satisfy the following conditions:

$|qL| = K\pi$ $|qL - \tilde{\Lambda}L| = M2\pi$ where K is an integer and M is any positive integer, whereupon the excitation of the betatron motion excited during the passage of said electrons through said interaction region is suppressed, the improvement wherein said magnet means comprises:

pluralities of first and second magnet sections arranged in alternating relation with respect to one another, each of said first sections providing a basic periodic field component and each of said second sections providing a supplementary periodic field component, said field components being characterized by respective amplitudes, periods, and transverse gradients;

the optical phase slip per period in passing through one of said second sections is an odd multiple of $2\pi$ radians; and the transverse gradient in said first sections is less than the inverse of the intrinsic dispersion constant, whereby the small signal gain is enhanced.

* * * * *